United States Patent
Shin et al.

(10) Patent No.: US 9,621,222 B2
(45) Date of Patent: Apr. 11, 2017

(54) ELECTRONIC DEVICE HAVING SENSOR-COMBINED ANTENNA DEVICE

(71) Applicant: Samsung Electronics Co., Ltd., Gyeonggi-do (KR)

(72) Inventors: In-Ho Shin, Daegu (KR); Ji-Woong Oh, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/691,701

(22) Filed: Apr. 21, 2015

(65) Prior Publication Data

US 2015/0303979 A1  Oct. 22, 2015

(30) Foreign Application Priority Data

Apr. 22, 2014  (KR) ........................ 10-2014-0047885

(51) Int. Cl.
*H04B 1/74* (2006.01)
*H04B 1/3827* (2015.01)
*H04B 7/06* (2006.01)
*H04B 7/08* (2006.01)

(52) U.S. Cl.
CPC .............. *H04B 1/74* (2013.01); *H04B 1/3838* (2013.01); *H04B 7/06* (2013.01); *H04B 7/08* (2013.01)

(58) Field of Classification Search
CPC ...... H04B 1/18; H04B 1/0053; H04B 1/0458; H04B 1/3833; H04B 1/44; H04B 1/74; H04B 7/06; H04B 7/08
See application file for complete search history.

(56) References Cited

U.S. PATENT DOCUMENTS

| | | | |
|---|---|---|---|
| 2012/0206556 A1* | 8/2012 | Yu | H04M 1/00 348/14.02 |
| 2013/0029625 A1* | 1/2013 | Park | H01Q 1/243 455/272 |
| 2013/0037924 A1* | 2/2013 | Lee | H01L 23/66 257/664 |
| 2014/0171159 A1* | 6/2014 | Endo | H01Q 1/243 455/575.7 |

FOREIGN PATENT DOCUMENTS

KR  10-2013-0013089 A  2/2013

* cited by examiner

*Primary Examiner* — Tuan Pham
(74) *Attorney, Agent, or Firm* — Cha & Reiter, LLC.

(57) ABSTRACT

An electronic device including an antenna device with an integrated sensor is provided. In an embodiment, first and second antenna radiators are operably connected. A communication module transmits or receive communication signals through the first and/or second antenna radiator. A separation circuit such as a series connected inductor is connected in a path between the first and second antenna radiators. The separation circuit prevents passage of the communication signals through the path while enabling passage of a sensing signal acquired through the first and second antenna radiators. A sensor module such as a proximity sensor receives the sensing signal acquired through the first and second antenna radiators. A processor controls a function of the electronic device based on the sensing signal.

15 Claims, 5 Drawing Sheets

ELECTRONIC DEVICE HAVING SENSOR-COMBINED ANTENNA DEVICE

CLAIM OF PRIORITY

This application claims the priority under 35 U.S.C. §119(a) to Korean Application Serial No. 10-2014-0047885, which was filed in the Korean Intellectual Property Office on Apr. 22, 2014, the entire content of which is hereby incorporated by reference.

TECHNICAL FIELD

Various embodiments of the present disclosure relate generally to an antenna device, and more particularly, to an internal antenna device within a portable electronic device, and an electronic device having such antenna device.

BACKGROUND

Recently, with the development of multimedia technologies, electronic devices with various functions have appeared on the market. These electronic devices generally have a convergence function for performing multiple complex functions, e.g., telephony, text messaging, web surfing, digital photography, etc.

Mobile terminals, also commonly referred to as smartphones, are one example of such electronic devices having a convergence function. A typical mobile terminal includes a touch type large screen display module and a high pixel camera module. Accordingly, in addition to a basic function for voice (telephony) communications with another party, the mobile terminal can photograph still and moving images. Further, the mobile terminal can play multimedia contents such as music and videos and can also perform web surf ng by connecting to a network. Today's mobile terminals include a high performance processor to enable high speed data and voice communication and other advanced functionality. For communication in various protocols, multiple internal antennas are employed to provide simultaneous communication at different bands, thereby enabling multitasked communication. The multiple antennas may also employ a diversity scheme to receive higher quality communication signals and reduce deleterious effects of multipath.

While the aforementioned electronic devices are diversified in terms of their functions, devices which are easily portable are advantageous and popular with consumers. For example, when considering electronic devices having the same functions, preference for a lighter, thinner, and simpler electronic device is a matter of course. Therefore, an ongoing effort for manufacturers is to provide electronic devices that are light, thin, and simple to use, without sacrificing functionality

SUMMARY

Various embodiments of the present disclosure may provide an electronic device having a sensor-combined antenna device.

Various embodiments of the present disclosure may provide an electronic device having a sensor-combined antenna device, which is implemented to smoothly achieve one function without degrading the performance of any other function.

Various embodiments of the present disclosure may provide an electronic device having a sensor-combined antenna device, which is implemented to achieve satisfactory performance while contributing to slimness of the device.

Various embodiments of the present disclosure may provide an electronic device having a sensor-combined antenna device, which is implemented to improve sensing performance by increasing a sensing area and consequently contribute to securing the reliability of the device.

According to various embodiments, an electronic device includes first and second antenna radiators which are operably connected. A communication module may transmit or receive communication signals through the first and/or second antenna radiator. A separation circuit such as a series connected inductor may be connected in a path between the first and second antenna radiators. The separation circuit may prevent passage of the communication signals through the path while enabling passage of a sensing signal acquired through the first and second antenna radiators. A sensor module such as a proximity sensor may receive the sensing signal acquired through the first and second antenna radiators. A processor may control a function of the electronic device based on the sensing signal.

According to various embodiments, a method for controlling an electronic device is provided. The method includes: receiving communication signals through at least one of a first antenna radiator and a second antenna radiator; receiving a sensing signal using the first and second antenna radiators, through a circuit path between the first and second antenna radiators; and controlling a function of the electronic device based on the sensing signal.

According to various embodiments of the present disclosure, a method for controlling an electronic device may include: receiving a communication signal through a first antenna radiator or a second antenna radiator; functionally separating the first and second antenna radiators when the electronic device performs communication; functionally connecting the first and second antenna radiators when the first and second antenna radiators are used in a sensor mode; receiving a sensing signal acquired from the first and second antenna radiators; and when the first and second antenna radiators detect a signal, controlling a function of the electronic device, corresponding to the detected signal.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, various embodiments of the present disclosure will be described in detail with reference to the accompanying drawings. Further, in the following description of the present disclosure, a detailed description of known functions and configurations incorporated herein will be omitted when it may diverge from the subject matter of the present disclosure. The terms as described below are defined in consideration of the functions in the embodiments, and the meaning of the terms may vary according to the intention of a user or operator, convention, or the like. Accordingly, the definitions of the terms should be made on the basis of the overall context of the embodiments.

In the description of the embodiments and the drawings, an example of an electronic device is described as a mobile terminal having an antenna device operated in at least one frequency band and is also used as a sensor, but the present disclosure is not limited thereto. Various types of devices including a display module may be employed as the electronic device, and examples of these devices may include a personal digital assistant (PDA), a laptop computer, a mobile phone, a smart phone, a netbook, a mobile Internet device (MID), an ultra mobile personal computer (UMPC), a tablet PC, a navigation device, an MP3 player, a wearable electronic device, and a flexible electronic device.

Figure 1:
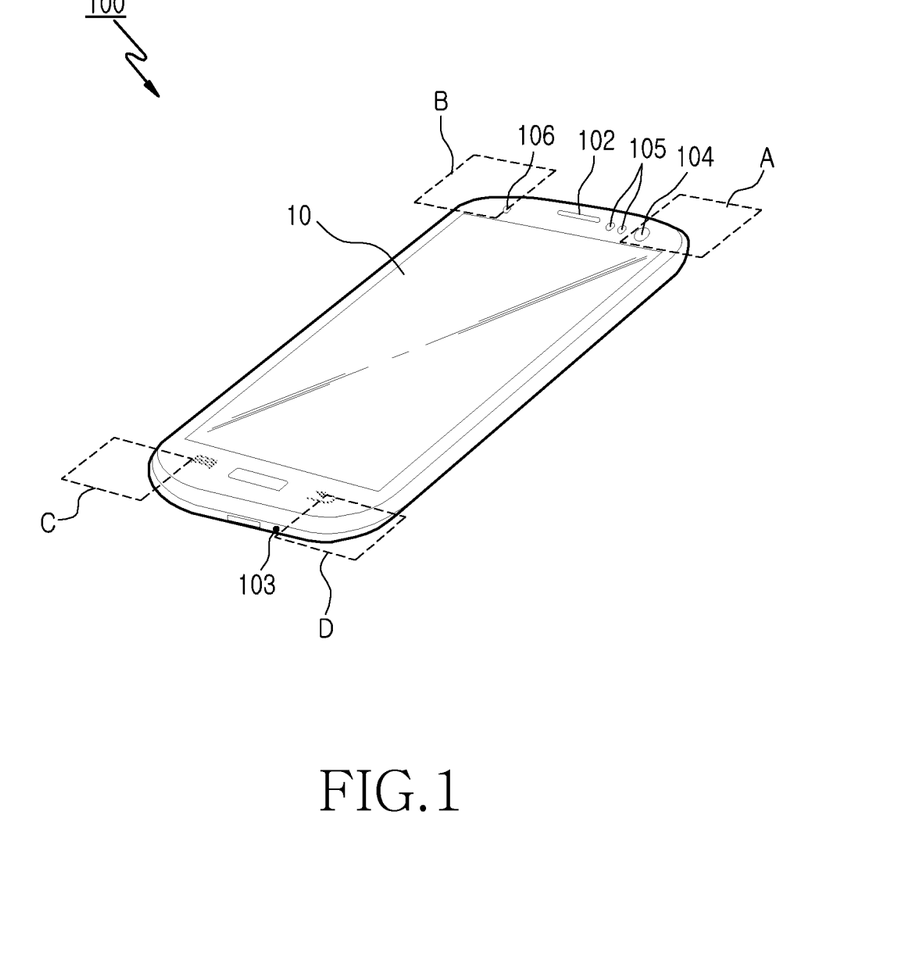
FIG. 1 is a perspective view illustrating an electronic device according to various embodiments of the present disclosure.

FIG. 1 illustrates a perspective view of an electronic device, 100, according to various embodiments of the present disclosure. Electronic device 100 may include a display module 10 mounted on the front surface of the electronic device 100, a speaker device 102 for receiving voice signals from a communication counterpart, disposed above the display module 10, and a microphone device 103 for transmitting voice signals to the communication counterpart, disposed below the display module 10, so that the electronic device can perform a basic communication function.

Further, components for performing various other functions of the electronic device 100 may be placed around the speaker device 102. Such components may include a camera module 104 designed for digital photography or video telephony (VT) with a communication counterpart. Further, the electronic device 100 may include a sensor module 105 for sensing parameters of the surrounding environment, so that device functions may be controlled according to the sensed parameters. The sensor module 105 may include a light sensor for detecting a level of ambient light and automatically adjusting the brightness of the display module 10 on the basis of the detected ambient light level and/or a proximity sensor for deactivating the display module 10 when detecting a user's action of placing the electronic device proximate his/her head during communication. Further, the above-mentioned components may include at least one LED indicator 106 for allowing a user to recognize information on various states of the electronic device 100, which is disposed on one side of the speaker device 102. Although not shown in the drawing, various other mechanical structures may be mounted.

According to various embodiments of the present disclosure, electronic components included in the electronic device 100 are placed in a space other than the space in which the display module 10 is disposed. The purpose of this is to secure visibility of the display module 10 and allow the electronic components to be arranged laterally of the display module 10 without overlapping the display module 10, thereby not only minimizing the thickness of the electronic device 100, but also preventing performance degradation due to mutual interference with the display module 10.

The electronic device 100 having a communication function may include at least one antenna device. A thin metal plate having a predetermined area and pattern shape may be used as the antenna device. However, the present disclosure is not limited thereto, as the antenna device may be made of a conductive material that is applied onto an antenna carrier or a substrate.

The antenna device may be disposed in the areas A, B, C, and/or D as shown in the drawing. The antenna device may be disposed in the above-mentioned areas so as to serve as an antenna radiator when the electronic device performs communication. The antenna device may also form part of a grip sensor or proximity sensor as will be explained below. The antenna device serving as a grip sensor may provide grip information to a processor, which may correspondingly reduce output power to reduce the specific absorption rate (SAR) at which electromagnetic energy is absorbed by the human body. It should be noted, the antenna device may be disposed in various other positions of the electronic device as well as the areas A, B, C, and D.

According to an embodiment of the present disclosure, the larger the area allocated for a structure for the grip sensor, the better the sensor performance that is secured by the structure. Likewise, for the antenna device, the larger the area allocated for the antenna radiator, the higher the degree of freedom for its spatial design. According to various embodiments, the antenna device may include a main antenna radiator and at least one sub antenna radiator wherein the sub antenna radiator is used with the main antenna radiator during communication (Tx, Rx), but only the main antenna radiator is used in a standby mode. In this way, it is possible to use the sub antenna radiator, together with the main antenna radiator, as a grip sensor. Therefore, when the antenna device is used as part of the grip sensor, all the areas of at least two antenna radiators are available to a sensor structure for the grip sensor. This arrangement advantageously may allow for improved sensor performance and/or a desired sensor performance in a smaller overall space as compared to conventional devices.

Figure 2:
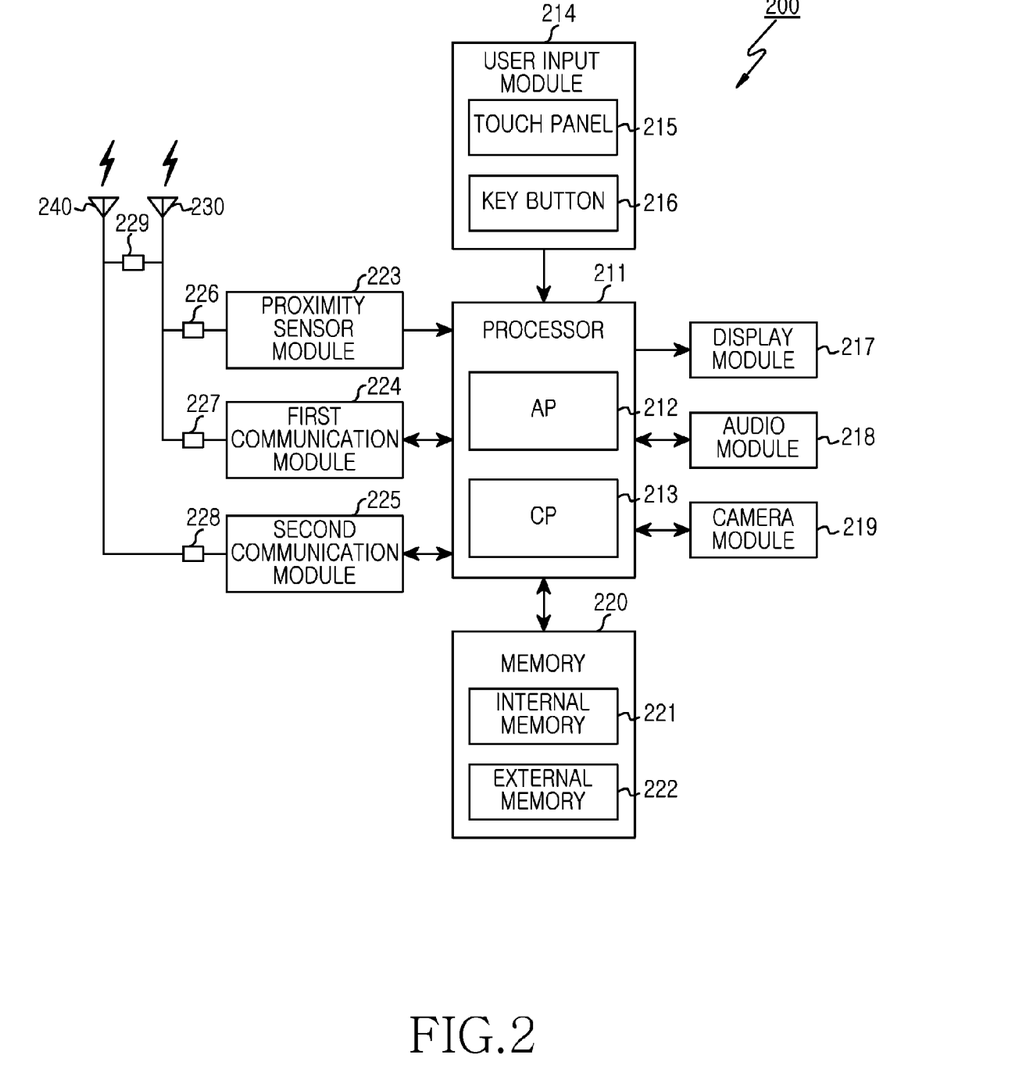
FIG. 2 is a structural block diagram of an electronic device according to an embodiment of the present disclosure.

FIG. 2 illustrates a block diagram of an electronic device according an embodiment of the present disclosure. As shown in FIG. 2, electronic device 200 is an embodiment of electronic device 100 described above, and may include a user input module 214, a display module 217, an audio module 218, a camera module 219, a memory 220, a communication module 224, 225, and at least one processor 211. Additional elements for other functions may also be included. Although not shown in the drawing, the electronic device 200 may include a sensor module besides the above-noted grip sensor or proximity sensor (or as a substitute for the above-noted grip sensor or proximity sensor). The sensor module may include at least one of a gesture sensor, a gyro sensor, a Hall sensor, an acceleration sensor, another proximity sensor, a temperature sensor, an olfactory sensor, a fingerprint recognition sensor, an iris recognition sensor, and a light sensor. Electronic device 200 may include an interface module (not shown), which may be used for data transmission and reception with an external device. The interface module may include at least one of a high-definition multimedia interface (HDMI), a universal serial bus (USB), a projector, and a D-subminiature (D-sub). The interface module may further include a secure digital (SD)/multi-media card (MMC) interface or an infrared data association (IrDA) interface.

The electronic device 200 may be implemented by incorporating at least two constituent units into one constituent unit or by dividing one constituent unit into at least two constituent units.

The user input module 214 may receive various commands input from a user, and may include at least one of a touch panel 215 and a key button 216.

The touch panel 215 may include at least one of a capacitive touch panel, a resistive touch panel, an acoustic wave (ultrasonic) touch panel, and an optical (infrared) touch panel. The touch panel 215 may detect not only a touch by direct contact but also a proximity input (e.g., hovering input) generated when an object (e.g., user's finger or stylus) enters within a predetermined detection range before making contact with the touch panel 215.

The key button 216 may include at least one physical key button that is disposed in a proper position where exposed to the outside of the electronic device 200, the key button 216 may include at least one of a wake-up/sleep key button, a volume up/down key button, a home key button, and a key button for mode switching that are disposed in proper positions outside of the electronic device 200.

The display module 217 may include a display panel which may, for example, be a panel for displaying an image as desired in terms of shape and color by applying an electric field to an anisotropic dielectric liquid crystal material injected between two substrates and adjusting the intensity of the electric field.

The audio module 218 may convert a sound and an electrical signal in a bidirectional manner. The audio module 218 may conceptually include an audio codec and may convert input or output sound information by including at least one of a speaker, a receiver, earphones, and a microphone.

The camera module 219 may perform a function of photographing still and moving images. The camera module 219 may be implemented to include at least one image sensor (e.g., front lens or rear lens), an image signal processor (ISP), or a flash LED.

The communication module may include a first communication module 224 and a second communication module 225. The first communication module 224 may process a signal transmitted or received through a main antenna radiator 230. The second communication module 225 may process a signal transmitted or received through a sub antenna radiator 240. The first and second communication modules 224, 225 may have a frequency band of operation including one in a protocol of at least one of long term evolution (LTE), worldwide interoperability for microwave access (WiMAX), code division multiple access (CDMA), global system for mobile communications (GSM), personal communication service (PCS), digital cellular system (DCS), wideband code division multiple access (WCDMA), evolution-data optimized (EVDO), high speed packet access (HSPA), global positioning system (GPS), Bluetooth (BT), and wireless fidelity (Wi-Fi). The communication module may include at least three communication modules rather than the two communication modules shown. Further, each of the main antenna radiator and the sub antenna radiator may include at least two separate antenna radiators.

The lines electrically connecting the first and second communication modules 224, 225 to the main and sub antenna radiators 230, 240 respectively may include at least one matching element 227, 228 that is interposed between the first and second communication modules 224, 225 and the main and sub antenna radiators 230, 240. The matching element 227, 228 may be used to adjust the bandwidth of each antenna radiator 230, 240 to a desired band, improve VSWR, and/or achieve the best transmission and reception conditions.

The electronic device 200 may include a proximity sensor module 223, which may be electrically connected to the main antenna radiator 230. The line connecting the main antenna radiator 230 and the proximity sensor module 223 may further include a "separation circuit" 226. The separation circuit 226 may prevent performance degradation when the main antenna radiator 230 is used for communication. The separation circuit 226 may include a floating inductor which operates as an RF choke, thereby preventing RF energy from passing therethrough and/or detuning the antenna.

The sub antenna radiator 240 may be electrically connected to the main antenna radiator 230 by a corresponding line (not shown) to form a two element array for beamforming. Another separation circuit 229 may be further employed between the sub antenna radiator 240 and the main antenna radiator 230. The separation circuit 229 may include a floating inductor. According to an embodiment of the present disclosure, when the sub antenna radiator 240 is used as a part of the grip sensor, the separation circuit 229 may keep the sub antenna radiator 240 electrically connected to the main antenna radiator 230 for conducting grip sensing signals, thereby increasing the sensing area of the grip sensor. However, since the separation circuit 229 may include a series inductance or the like, RF communication signals do not flow across the separation circuit 229. As such, when the electronic device 200 performs communication, the antenna device does not detrimentally detune due to the presence of the separation circuit 229, since the sub antenna radiator 240 is isolated from the main antenna radiator 230 across this path.

The proximity sensor module 223 may provide the processor 211 with a signal corresponding to a change in capacitance according to the distance between the main and sub antenna radiators 230, 240 and due to a conductor (e.g., due to a user's hand or conductive stylus, or to a user's head placed against the electronic device during a voice call) located outside of the electronic device. (It is noted here that the proximity sensor module 223 is not to be confused with another proximity sensor that may be provided, embedded with the touch screen display, to detect hovering above the touch screen for the purpose of providing display functionality according to the hovering.) When a signal corresponding to a change in capacitance, received from the proximity sensor module 223, reaches a threshold, or when a proximity signal is received from the proximity sensor module 223, the processor 211 may reduce the power supplied to the main and sub antenna radiators 230, 240, thereby reducing the specific absorption rate (SAR). The capacitance change may be due to the user placing the electronic device 200 close to his/her head during a voice call. Thus, the processor 211 may detect this situation and reduce the power supplied to the main antenna radiator 230 and/or the sub antenna radiator 240, thereby reducing the specific absorption rate at which electromagnetic energy is absorbed by the human body.

The electronic device 200 may further include various sensor modules equivalent to the proximity sensor module 223. The electronic device 200 may, for example, include a touch sensor module, a thermal sensor module, a humidity sensor module, and the like. In other embodiments, each of these sensor modules could be used in place of proximity sensor module 223, so that a portion of a sensing circuit would include the antenna radiators in a similar manner to that described herein for the proximity sensor module 223.

The memory 220 may include at least one of an internal memory 221 and an external memory 222. The internal memory 221 may include at least one of a volatile memory (e.g., dynamic random access memory (DRAM), static RAM (SRAM), or synchronous dynamic RAM (SDRAM)), a non-volatile memory (e.g., one time programmable read-only memory (OTPROM), programmable ROM (PROM), erasable and programmable ROM (EPROM), electrically erasable and programmable ROM (EEPROM), mask ROM, or flash ROM), a hard disk drive (HDD), and a solid state drive (SSD). The processor 211 may load a command or data received from at least one of a non-volatile memory and other elements into a volatile memory and may process the loaded command or data. The processor 211 may store data received from or generated by other elements in a non-volatile memory.

The external memory 222 may, for example, include at least one of a compact flash (CF), a secure digital (SD), a micro secure digital (Micro-SD), a mini secure digital (Mini-SD), an extreme digital (xD), and a Memory Stick.

The memory 220 may store an operating system for controlling resources of the electronic device 200, application programs for executing applications, and the like. The operating system may include a kernel, middleware, an application program interface (API), and the like.

The kernel may include a system resource manager for managing resources and a device driver. The resource manager may, for example, include a processor manager, a memory manager, or a file system manager and may perform a function of controlling, allocating, or retrieving system resources. The device driver may access and control various elements of the electronic device 200 in terms of software. To this end, the device driver may be divided into an interface and an individual driver module provided by each hardware provider. The device driver may, for example, include at least one of a display driver, a camera driver, a Bluetooth driver, a shared memory driver, a USB driver, a keypad driver, a Wi-Fi driver, an audio driver, and an inter-process communication (IPC) driver.

The middleware may include a plurality of modules that has been previously implemented to provide functions that various applications require in common. The middleware may provide the common required functions through the API such that the application can efficiently use limited system resources within the electronic device. The middleware may, for example, include at least one of an application manager, a window manager, a multimedia manager, a resource manager, a power manager, a database manager, and a package manager. Further, the middleware may include at least one of a connectivity manager, a notification manager, a location manager, a graphic manager, and a security manager. Further, the middleware may include a runtime library or other library modules. The runtime library is a library module used by a compiler to add a new function through a programming language while an application is being executed. The runtime library may, for example, perform an input/output function, a memory management function, a function associated with an arithmetic function, and the like. The middleware may also create and use a new middleware module through various functional combinations of the above described internal element modules. In addition, the middleware may provide modules specified for each type of operating system in order to provide differentiated functions.

According to an embodiment of the present disclosure, the API is a set of API programming functions and may be provided in different configurations according to operating systems. As an example, when the operating system corresponds to Android® or iOS®, for example, one API set may be provided for each platform. As another example, when the operating system corresponds to Tizen®, for example, at least two API sets may be provided for each platform.

The application may perform at least one function using an application program. The application may, for example, be classified into a preloaded application and a third party application. The application may, for example, include a home application for executing a home screen, a dialer application, a short message server (SMS)/multi-media message service (MMS) application, a messenger application such as Kakao Talk® or Chat On®, a browser application, a camera application, an alarm application, a contacts (or address book) application, a voice dial application, an email application, a calendar application, a media player, an album application, a clock application, and the like.

The processor 211 may drive an operating system and an application program so as to control a plurality of hardware and software components connected to the processor 211 and to process and calculate various data including multimedia data.

The processor 211 may control the first and second communication modules 224, 225 that control signals transmitted and received through the main and sub antenna radiators 230, 240. The processor 211 may identify a current driving mode and selectively drive the first and second communication modules 224, 225 and the proximity sensor module 223 according to the corresponding driving mode. When the main and sub antenna radiators 230, 240 serve as part of the proximity sensor and a signal corresponding to the approach of an external conductor is received by the proximity sensor module 223, the processor 211 may control the electronic device to perform a function corresponding to the received signal. When a signal corresponding to a change in capacitance, received from the proximity sensor module 223, reaches a threshold or when a proximity signal is received from the proximity sensor module 223, the processor 211 may reduce the power supplied to the main and sub antenna radiators 230, 240, thereby reducing the specific absorption rate (SAR).

The processor 211 may include at least one application processor (AP) 212 and/or at least one communication processor (CP) 213. Although FIG. 2 shows the AP 212 and the CP 213 as being included in the processor, the AP 212 and the CP 213 may be included in different IC packages respectively. The AP 212 and the CP 213 may also be included in one IC package.

The AP 212 may drive an operating system or an application program so as to control a plurality of hardware or software components connected to the AP 212 and to process and calculate various data including multimedia data. The AP 212 may be implemented as a system on chip (SoC). The processor 211 may further include a graphic processing unit (GPU).

The CP 213 may perform a function of managing a data link and converting a communication protocol in communication between the electronic device 200 including the above hardware and other electronic devices connected to the electronic device 200 over a network. The CP 213 may be implemented as an SoC. The CP 213 may perform at least some multimedia controlling functions.

The AP 212 or the CP 213 may load a command or data received from at least one of a non-volatile memory and other elements connected to each of the AP 212 and the CP 213 into a volatile memory and may process the loaded command or data. The AP 212 or the CP 213 may store data received from or generated by at least one of other elements in a non-volatile memory.

Figure 3:
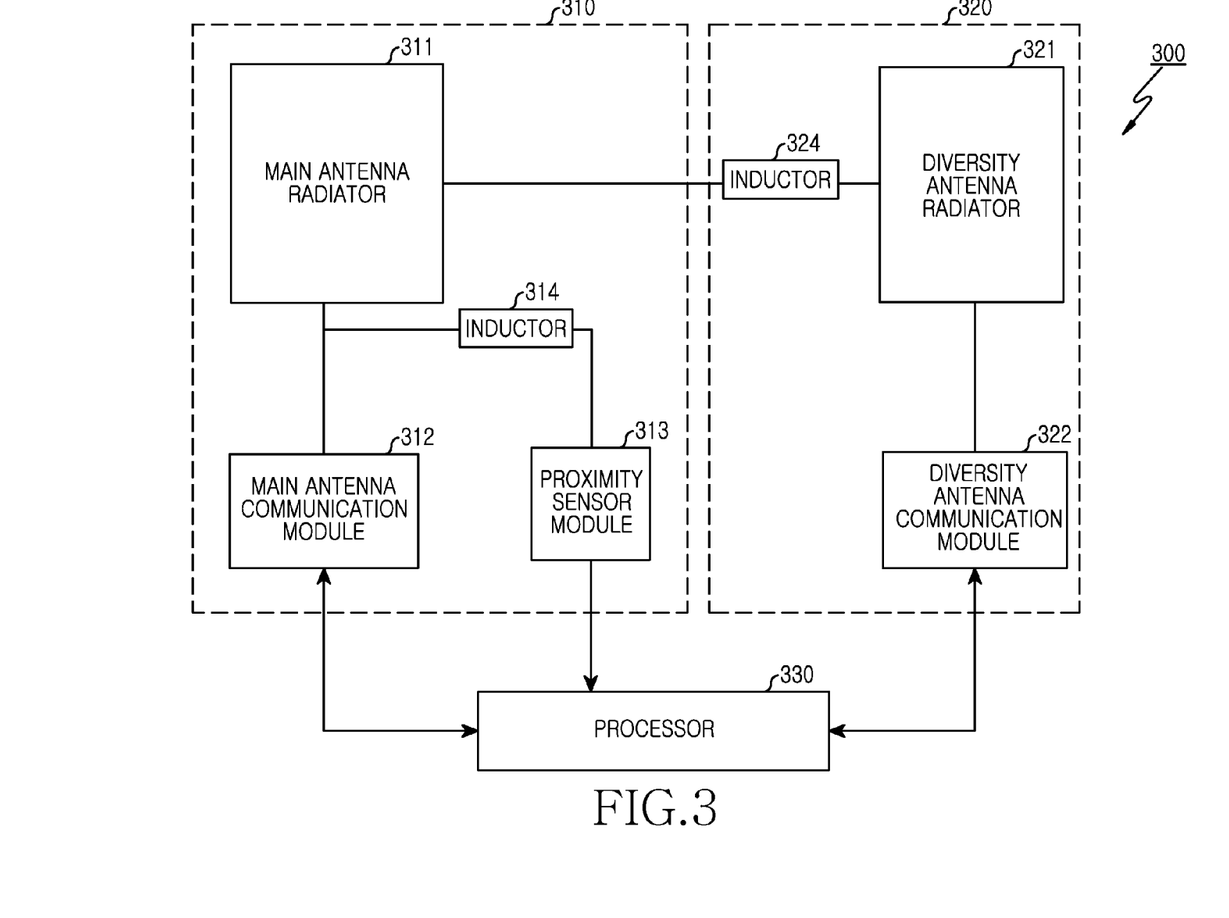
FIG. 3 is a block diagram illustrating a key configuration of an electronic device according to an embodiment of the present disclosure.

FIG. 3 illustrates a block diagram showing an example configuration of an electronic device, 300, according to an embodiment of the present disclosure. Electronic device 300 is an example of electronic device 200 or 100 described above. Electronic device 300 may include a main antenna module 310 and a sub antenna module 320. A processor 330 may control the main antenna module 310 and the sub antenna module 320 respectively.

The main antenna module 310 may include a main antenna radiator 311, and the main antenna radiator 311 may include a main antenna communication module 312 that is under the control of the processor 330. The main antenna module 310 may include a proximity sensor module 313 to carry out a proximity sensing function. The proximity sensor module 313 may be designed as a grip sensor module, by considering a grip condition as causing a higher degree of capacitance change as compared to a proximity condition. That is, a sensed grip condition may cause a change of capacitance in a sensor circuit above a first capacitance threshold, via a user's touch on a relevant outer surface. A sensed proximity condition, however, may occur when an object such as a user's body part is within a predetermined distance from that surface, causing a capacitance change in a sensor circuit above a second, lower threshold. The following discussion will refer to a proximity sensor as an example, but the principles are also apply to a grip sensor (and other types of sensors). A proximity sensor may be considered as comprising the proximity sensing module 313 in conjunction with conductive elements of the main antenna radiator 311 and diversity antenna radiator 321, and the circuit connections in between. A grip sensor may likewise be considered as comprising the proximity sensing module 313 designed as a grip sensing module, in conjunction with the same conductive elements as for the proximity sensor.

When the main antenna radiator 311 and/or a sub antenna radiator 321 serve as a conductor for the proximity sensor, the proximity sensor module 313 may provide the processor 330 with a sensing signal applied thereto. The line connecting the main antenna radiator 311 and the proximity sensor module 313 may further include a separation circuit, exemplified as an inductor 314. By proper design and placement, inductor 314 may not cause performance degradation when the main antenna radiator 311 serves as at least part of the antenna device. Inductor 314 may be a floating inductor.

The sub antenna module 320 may include a diversity antenna radiator 321 and a diversity antenna communication module 322, the latter being controllable by the processor 330 of the electronic device 300. The diversity antenna radiator 321 may be electrically connected to the main antenna radiator 311 by a connecting line(s) (not shown) to provide antenna diversity as in a conventional antenna diversity scheme. A separation circuit, exemplified by an inductor 324, may be further employed between the diversity antenna radiator 321 and the main antenna radiator 311. Inductor 324 may be a floating inductor. When the diversity antenna radiator 321, together with the main antenna radiator 311, are used as part of the grip sensor, the inductor 324 may keep the diversity antenna radiator 321 electrically connected to the main antenna radiator 311, thereby increasing the sensing area of the grip sensor. That is, the sensor circuit may involve conduction of low frequency AC or DC current, which conducts through the inductor 324, since the inductor 324 presents a low impedance or short circuit at low frequencies or DC. However, inductor 324 may operate as an RF choke, i.e., as an open circuit at high RF frequencies used for communication by device 300. Hence, when the electronic device 300 performs communication, communication signals are not conducted through the inductor 324, so that antenna performance does not degrade. That is, the inductor 324 may not negatively impact a matching condition or radiating pattern of the antenna device. The diversity antenna radiator 321 may then operate together with the main antenna radiator 311 to perform a conventional antenna diversity function. In one example, electronic device 300 may control the main antenna radiator 311 and the diversity antenna radiator 321 such that only the main antenna radiator 311 is operated during communication (Rx, Tx) but the diversity antenna radiator 321 is also operated in a standby mode (Rx).

According to various embodiments of the present disclosure, since the two antenna radiators 311, 321 serve as part of the grip sensor, the sensing performance of the grip sensor may be improved due to an increase in the sensing area of the grip sensor. Note that portions of the antenna radiators 311, 321 may be disposed in close proximity to an exterior surface of electronic device 300, so that when the user grips device 300 at the exterior surface adjacent to antenna radiators 311, 321, a grip condition may be sensed by the grip sensor.

Figure 4:
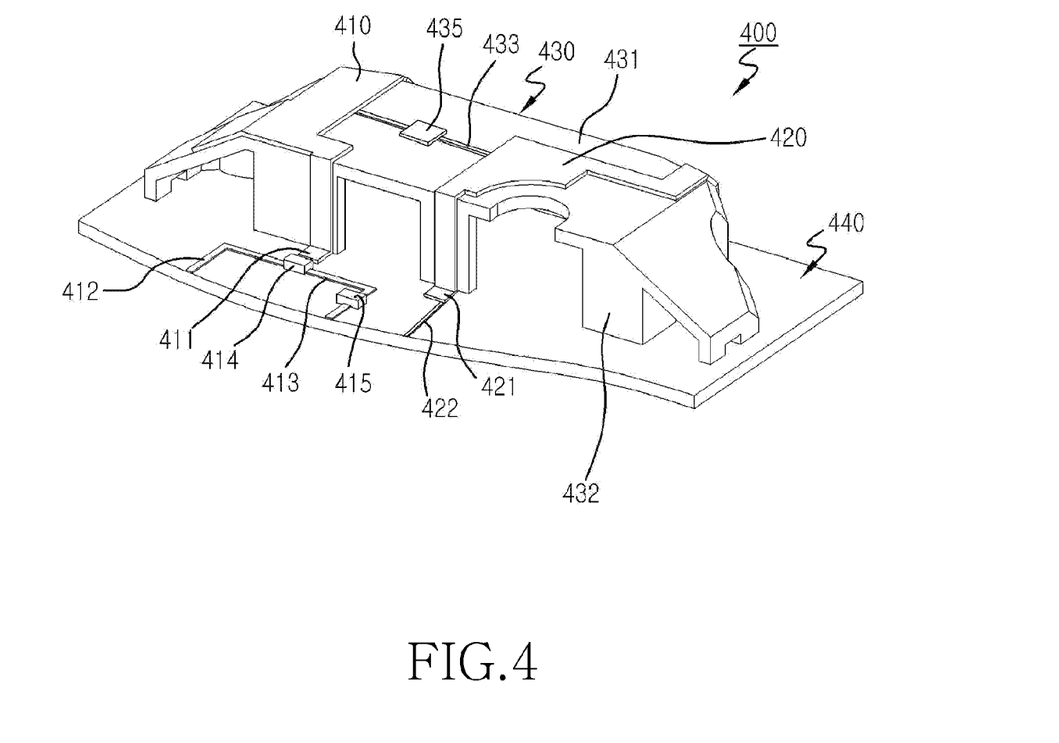
FIG. 4 is a perspective view illustrating an antenna device according to an embodiment of the present disclosure, which is applied to an antenna carrier.

FIG. 4 illustrates a perspective view of an antenna device according to an embodiment of the present disclosure, which is applied to an antenna carrier.

As shown in FIG. 4, the antenna device 400 may include a main antenna radiator 410 and a sub antenna radiator 420. The main antenna radiator 410 is an example of the main antenna radiator 230 and of the main antenna radiator 311 described above, and may perform the functions of the same described above. Likewise, the sub antenna radiator 420 is an example of the sub antenna radiator 240 and the diversity antenna radiator 321. The sub antenna radiator 420 may be mounted to one antenna carrier 430 and may not only be supplied with RF power (transmitting and/or receiving communication signals) but may also perform proximity sensing. Proximity sensing is possible via connection to a proximity sensing module (not shown), by mounting the antenna carrier onto a substrate 440 for connection to the proximity sensing module, which may also be mounted on substrate 440. Although FIG. 4 shows that one sub antenna radiator 420 is used, in other embodiments, a plurality of sub antenna radiators may be used.

According to an embodiment of the present disclosure, the antenna carrier 430 is an injection molded part made of a dielectric material, and in addition to the antenna radiators 410, 420, various other electronic components may be mounted to the antenna carrier 430. These electronic components may include at least one of a speaker module, a microphone module, a vibrator motor, an interface module, various sensing modules, and a camera module.

The antenna carrier 430 may include an upper surface 431 and a side surface 432 that partially extends by a certain length from the edge of the upper surface 431. The side surface 432 may be substantially perpendicular to the upper surface 431 and may provide the distance by which the main antenna radiator 410 and the sub antenna radiator 420 mounted to the antenna carrier 430 are spaced from the substrate 440.

Each of the main antenna radiator 410 and the sub antenna radiator 420 may be fixed in such a manner that a thin metal plate is laminated on the upper surface 431 and/or the side surface 432 of the antenna carrier 430. The main antenna radiator 410 and the sub antenna radiator 420 may be fixed to the antenna carrier 430 by bonding, a double-sided adhesive tape, ultrasonic welding, and the like. Each of the main antenna radiator 410 and the sub antenna radiator 420 may be a flexible printed circuit board (FPCB) having a predetermined pattern formed thereon, or may be a coating that is made of a metal material and applied in a predetermined shape on the antenna carrier 430.

The main antenna radiator 410 may be electrically connected to a main antenna communication module (not shown) and a proximity sensor module (not shown) through branch lines 412, 413 on the substrate 440. The main antenna radiator 410 may be electrically connected to a power supply line 412 (which is a branch line connected to one side of a filter 414) by its power supply pad 411 extending along the side surface 432 of the antenna carrier 430. Another branch line 413 may be electrically connected between another side of the filter 414 and the proximity sensor module.

The filter 414 may be provided for separating a signal to be processed by the main antenna communication module and a signal to be processed by the proximity sensor module. Filter 414 may be included at the point where the branch lines diverge from each other.

In the example of FIG. 4, the line 413 to which the proximity sensor module is connected may include a separation circuit 415 (an example of inductor 314 of FIG. 3 or separation circuit 226 of FIG. 2) for preventing performance degradation of the antenna device 400. The separation circuit 415 may include a floating inductor.

The antenna carrier 430 may include a line 433 for electrically connecting the main antenna radiator 410 and the sub antenna radiator 420. The line 433 may be separated by a separation circuit 435 (which may be an example of inductor 324 or separation circuit 229 described above). In the example, the line 33 has a width that is significantly less than the widths of each of the antenna radiators 410 and 420. When the sub antenna radiator 420 is used as a conductor of the proximity sensor, the separation circuit 435 may keep the sub antenna radiator 420 electrically connected to the main antenna radiator 410 at the frequency used for sensing, thus resulting in an increase in the sensing area of the proximity sensor.

Figure 5:
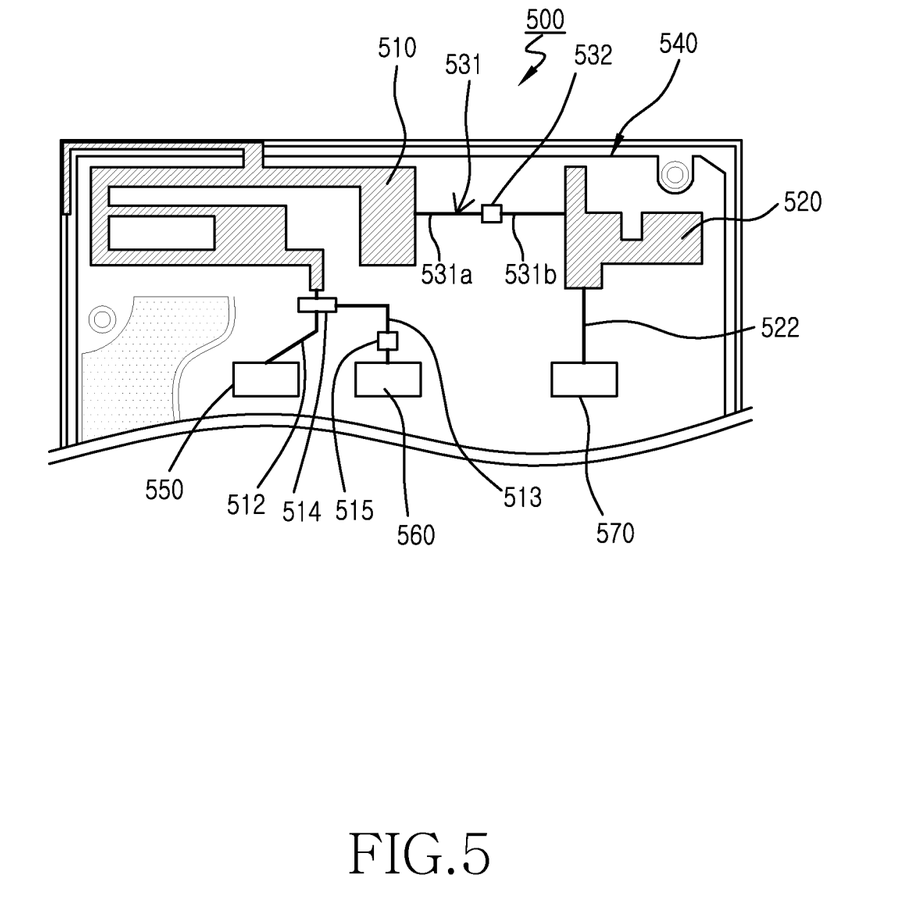
FIG. 5 is a plan view illustrating an antenna device according to an embodiment of the present disclosure, which is applied to a substrate.

FIG. 5 illustrates a plan view of an antenna device, 500, according to an embodiment of the present disclosure, which is applied to a substrate.

In FIG. 4, an example has been proposed, in which an antenna carrier is mounted on a substrate, and both a main antenna radiator and a sub antenna radiator are mounted to the antenna carrier. As another example, however, the technical idea of the present disclosure may be implemented without the antenna carrier.

Referring to FIG. 5, the antenna device 500 may include a main antenna radiator 510 and a sub antenna radiator 520. The main antenna radiator 510 and the sub antenna radiator 520 may be disposed or formed directly on the substrate 540. Each of the main antenna radiator 510 and the sub antenna radiator 520 may be a thin metal plate disposed on a non-ground region of the substrate 540 or a flexible printed circuit board (FPCB) having a predetermined pattern formed thereon, but the present disclosure is not limited thereto. Each of the main antenna radiator 510 and the sub antenna radiator 520 may, for example, be a pattern formed directly on the substrate 540.

The main antenna radiator 510 may be electrically connected to a main antenna communication module 550 and a proximity sensor module 560 through branch lines 512, 513 on the substrate 540. A filter 514 for separating a signal to be processed by the main antenna communication module 550 and a signal to be processed by the proximity sensor module 560 may be included at the point where the branch lines diverge from each other.

The line 513 to which the proximity sensor module 560 is connected may include a separation circuit 515 for preventing performance degradation of the antenna device due to a mismatch that could otherwise be caused from the circuit connection to proximity sensor module 560. The separation circuit 515 may include a floating inductor.

The antenna device 500 may include a line 531 for electrically connecting the main antenna radiator 510 and the sub antenna radiator 520. The line 531 may be comprised of two separated lines 531a, 531b, which are connected by a separation circuit 532. Separation circuit 532 may be an example of separation circuit 229 or inductor 324 discussed above. When the sub antenna radiator 520 is used as a conductor of the proximity sensor, the separation circuit 532 may keep the sub antenna radiator 520 electrically connected to the main antenna radiator 510 for the sensing circuit operation, thus resulting in an increase in the sensing area of the proximity sensor.

Various embodiments of the present disclosure can improve the performance of an electronic device while contributing to slimness of the device, can achieve one function without degrading the performance of any other function, and consequently can be helpful to secure the reliability of the electronic device.

It will be apparent to those skilled in the art that various modifications and changes falling within the scope of the appended claims may be made in these embodiments. In other words, the embodiments may be implemented in a very variety of ways without departing from the sprit and scope of the present disclosure as defined by the appended claims.

What is claimed is:

1. An electronic device comprising:
a main antenna radiator operatively connected to a first communication module;
a diversity antenna radiator operatively connected to the main antenna radiator and a second communication module,
wherein the first communication module is configured to transmit or receive a communication signal through the main antenna radiator, and
wherein the second communication module is configured to transmit or receive a communication signal through the diversity antenna radiator;
a separation circuit connected in a path between the main antenna radiator and the diversity antenna radiator, the separation circuit preventing passage of the communication signals through the path while enabling passage of a sensing signal acquired through the main antenna radiator and the diversity antenna radiator;
a sensor module configured to receive the sensing signal acquired through the main antenna radiator and the diversity antenna radiator;
at least one processor configured to control the first communication module, the second communication module, and the sensor module, and to control a function of the electronic device based on the sensing signal; and
a filter for separating a signal to be processed by the first communication module and a signal to be processed by the sensor module and configured to be disposed where a first branch line coupled to the first communication module diverges from a second branch line coupled to the sensor module.

2. The electronic device of claim 1, wherein the processor uses the main antenna radiator to transmit and receive the communication signals and uses the diversity antenna radiator to receive the communication signals.

3. The electronic device of claim 1, wherein the processor is provided with the sensing signal acquired from the main antenna radiator and the diversity antenna radiator by the sensor module.

4. The electronic device of claim 1, wherein the main antenna radiator and the diversity antenna radiator are operated in the same frequency band.

5. The electronic device of claim 1, wherein each of the main antenna radiator and the diversity antenna radiator further includes a matching element at a connection to the first communication module or the sensor module.

6. The electronic device of claim 1, wherein the separation circuit includes at least one floating inductor that is interposed between the main antenna radiator and the diversity antenna radiator on a line electrically connecting the main antenna radiator and the diversity antenna radiator.

7. The electronic device of claim 1, wherein the path between the main antenna radiator and the diversity antenna radiator includes a conductive line.

8. The electronic device of claim 7, wherein the conductive line includes a first line and a second line, wherein the separation circuit is connected between the first and second lines.

9. The electronic device of claim 7, further including a second separation circuit between the main antenna radiator and the sensor module.

10. The electronic device of claim 1, wherein the sensor module includes at least one of a touch sensor module, a thermal sensor module, a humidity sensor module, and a proximity sensor module.

11. The electronic device of claim 1, wherein the sensor module is a proximity sensor module.

12. The electronic device of claim 1, wherein the sensor module is a grip sensor module.

13. The electronic device of claim 1, wherein at least one of the main antenna radiator and the diversity antenna radiator is mounted to an antenna carrier that is mounted on a substrate, and the antenna carrier includes at least one of a speaker module, a microphone module, a vibrator motor, an interface module, and a camera module.

14. The electronic device of claim 13, wherein each of the main antenna radiator and the diversity antenna radiator comprises at least one of a flexible printed circuit board (FPCB) having a predetermined pattern formed thereon and a conductive coating material applied on an upper surface of the antenna carrier.

15. The electronic device of claim 1, wherein the main antenna radiator and the diversity antenna radiator are disposed directly on a non-ground region of a substrate of the electronic device.

* * * * *